United States Patent Office 3,205,167
Patented Sept. 7, 1965

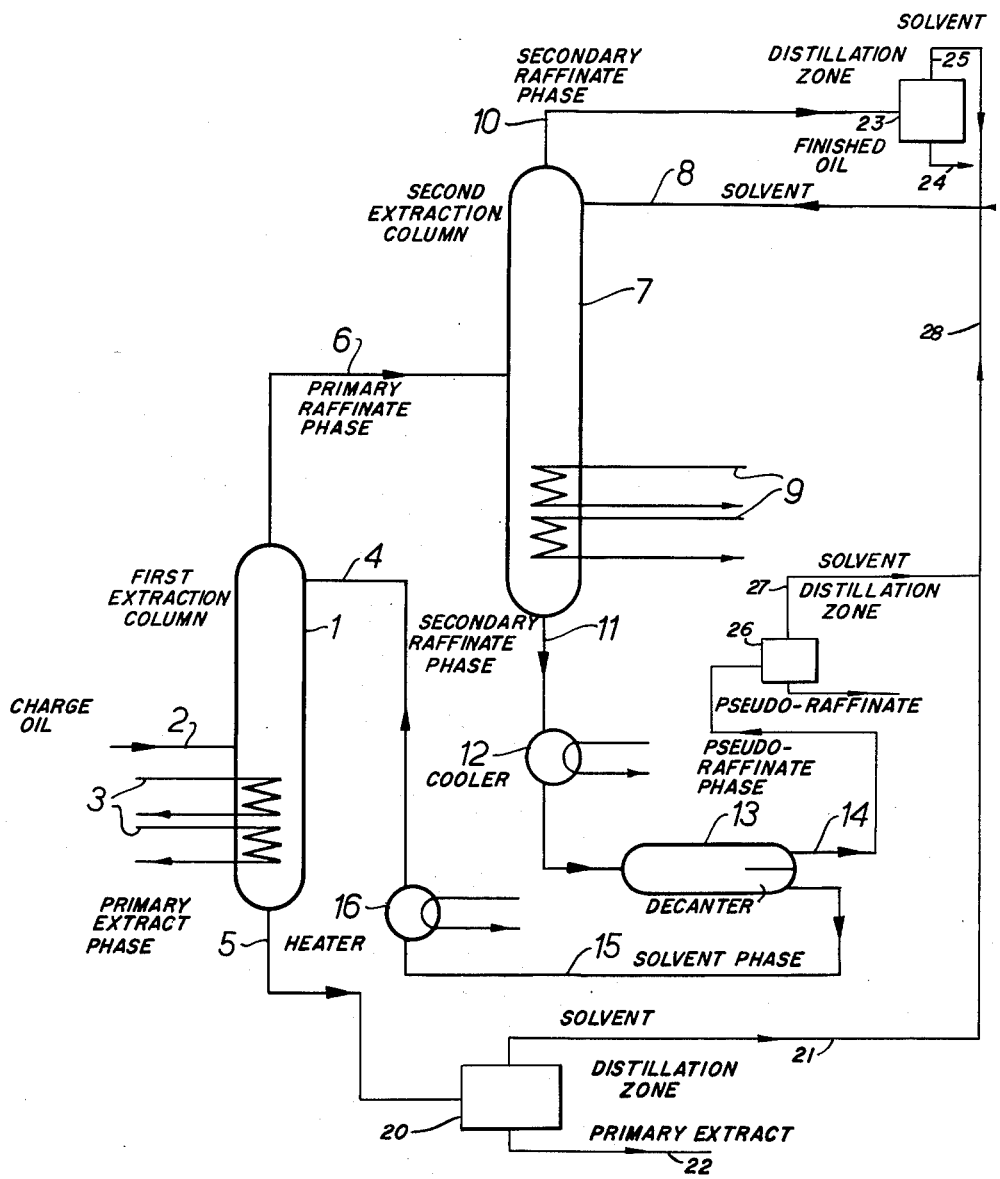

3,205,167
SOLVENT EXTRACTION OF HYDROCARBON MIXTURES
Jacques Demeester, Paris, France, assignor to The British Petroleum Company Limited, London, England, a joint-stock corporation of Great Britain
Filed Apr. 18, 1962, Ser. No. 188,466
Claims priority, application France, Apr. 24, 1961, 859,695
13 Claims. (Cl. 208—317)

This invention relates to a process for the selective solvent extraction of hydrocarbon mixtures, for example lubricating oils, and particularly a process for the solvent extraction of lubricating oils using furfural.

A known process for the extraction of lubricating oils by a solvent, for example furfural, comprises circulating the oil to be refined and the solvent counter-currently in a column and withdrawing from the column two phases, a raffinate phase at the head of the column which contains the greater part of the required refined oil and a small quantity of solvent, and an extract phase at the bottom of the column which contains the greater part of the solvent together with aromatic, naphthenic and sulphurised hydrocarbons.

These two phases may then be separated into their constituents by distillation.

It is also known to treat the extract phase by cooling and thus separating it into two phases, one phase comprising a naphthenic oil known as a pseudo-raffinate and containing a little solvent and the other phase comprising the extract proper with the more aromatic and sulphurised components of the oil and a large quantity of solvent. The solvent may be recovered from the different phases by distillation and the pseudo-raffinate may be used, for example, for the manufacture of bearing oils. For convenience then aphthenic, aromatic and sulphurised hydrocarbons extracted by the solvent are hereinafter termed "impurities."

In solvent extraction processes the quantity of solvent employed is an important factor with regard to the economy of the process. It has now been found that by modifying conventional processes of solvent extraction it is possible to obtain equivalent yields of products of given quality whilst using a smaller quantity of fresh solvent. At the same time a pseudo-raffinate may be obtained.

According to the present invention a process for solvent extracting a hydrocarbon feedstock comprises contacting the feedstock counter-currently with solvent in a first extraction column and recovering from the first column a primary raffinate and a primary extract, contacting the primary raffinate countercurrently with solvent in a second extraction column and recovering from the second column a secondary raffinate and a secondary extract, passing the secondary extract to a settling-out vessel and recovering from the settling-out vessel a pseudo-raffinate phase and a solvent phase, recycling the solvent phase to the first extraction column, treating the primary extract to separate solvent therefrom and recycling this solvent to the second extraction column. The secondary raffinate and pseudo-raffinate may also be treated to recover the relatively small quantities of solvent which they contain and this solvent may be combined with the solvent recovered from the primary extract and recycled to the second extraction column.

The process is particularly suitable for the solvent extraction of lubricating oil fractions and the preferred solvent is furfural.

Each of the extraction columns is maintained at a suitable temperature gradient decreasing from top to base and the invention includes the provision of means for heating or cooling the vessels and product and solvent streams as required. The temperatures employed will depend upon the feedstock being treated and the product required but, for lubricating oil fractions, the temperatures in the extraction columns will generally lie within the range 175°–50° C., preferably within the range 140°–75° C. Suitable gradients may for example be within the range 20–50° C. in the first column and 10–30° C. in the second column. Preferably the column top temperature is the same in each column with a steeper gradient in the first column, i.e, a higher base temperature in the second column. The gradient in each column may be linear but a particularly preferred feature of the present invention is the use of a deformed temperature gradient in the columns such that the gradient in the lower part of each column is steeper than the gradient in the upper part of each column. For example, the temperature in the upper third of each column may be substantially the same as the column top temperature, decreasing substantially linearly down the remaining two-thirds of each column.

The temperature of the settling-out vessel is maintained at a lower temperature than that of the base of the second extraction column for example a temperature within the range 20°–80° C., preferably 40–60° C.

The two-stage extraction process of the present invention makes it possible to employ in the first column at the same time as the charge to be treated a solvent which has already operated in the second column where it has served for extracting the impurities which are still present in the primary raffinate coming from the first column. The solvent has been in the meantime freed from the major part of its extract by settling-out at a lower temperature. The solvent power of the solvent is thus used twice, which results in a decrease in the quantity of solvent necessary to obtain a refined product having the same properties as a refined product obtained by a single-stage extraction process, yet giving substantially the same yield.

The mode of execution of the invention is described with reference to the accompanying drawing which shows a schematic flow diagram of a two-stage solvent extraction process.

A mineral lubricating oil is contacted counter-currently with furfural as solvent in a column 1, in which a temperature gradient ($T_1$–$T_2$) is maintained. The charge is fed into the column through an inlet pipe 2, whilst the solvent phase obtained by the settling-out of an intermediate raffinate (pseudo-raffinate) arrives in the column 1 in the vicinity of its upper end through a pipe 4. This column 1 is fitted in its lower part with heat exchangers 3.

The extract phase containing the impurities of the oil leaves the lower part of the column 1 through a pipe 5, whence it is sent to a distillation zone 20 for the purpose of recovering the solvent and also recovering the primary extract as a product. The solvent leaves the distillation zone 20 by a pipe 21 for reuse in the system as will be described more fully hereinafter. The primary extract leaves the distillation zone 20 by the pipe 22 for withdrawal from the system as a desired product.

The primary raffinate phase, known as the primary raffinate, which still contains impurities, passes from the upper part of the column 1 through a pipe 6 to the second column 7, where it is treated countercurrent with fresh solvent which arrives in the column 7 in the vicinity of its upper end through a pipe 8. A temperature gradient ($T_3$–$T_4$) is maintained in the column 7, which is equipped in its lower part with heat exchangers 9.

The secondary raffinate phase containing the finished oil freed from its impurities and a little solvent leaves from the upper part of the column 7 through a pipe 10, whence it passes to a distillation zone 23 for recovery of the solvent and the finished oil. The finished oil leaves the distillation zone 23 by a pipe 24 and is withdrawn from the system. The solvent leaves the distillation zone by a pipe 25 for recycling to the column 7 through the solvent supply pipe 8.

The secondary extract phase leaves the lower part of the column 7 through a pipe 11 and passes through a cooler 12 which brings it to the temperature $T_5$ and a decanter 13 where it is separated into two layers, namely a layer constituting a pseudo-raffinate phase and consisting of pseudo-raffinate still containing some solvent and a layer constituting a solvent phase and consisting of solvent still containing a little extract.

The pseudo-raffinate phase leaves the decanter 13 through a pipe 14 which takes it to a distillation zone 26 to recover solvent, whilst the solvent phase still containing some extract leaves through a pipe 15 and heater 16 and pipe 4 and passes into the upper part of the column 1.

The solvent recovered in distillation zone 26 leaves the distillation zone through a pipe 27 and is combined with solvent leaving the distillation zone 20 through the pipe 21. The combined solvents pass through a pipe 28 for recycling to the column 7 through the fresh solvent supply pipe 8.

The invention is illustrated by means of the following comparative Example 1:

*Example 1*

A lubricating oil having the following properties was solvent extracted with furfural.

Origin: paraffinic distillate from Kuwait crude
Specific gravity at 15° C.: 0.940
Kinematic viscosity at 100° C: 15.5 centistokes
Pour point: 39° C.

(*a*) The oil was treated by a traditional single-stage process under the following conditions.

Temperature at the head of the column: 125° C.
Temperature at the bottom of the column: 85° C.
Solvent/oil ratio: 340% by volume A raffinate was obtained with a viscosity index equal to 95 after de-waxing for a pour point of −15° C.
The yields were as follows:

Raffinate=44.2% by weight
Extract=55.8% by weight (*b*) The same oil was treated by the two-stage process of the present invention, under the following conditions.

Temperatures in the first column 1 (FIGURE 1):
   At top of column ($T_1$) _____ 110° C.
   At bottom of column ($T_2$) _____ 85° C.
Temperatures in the second column 7:
   At top of column ($T_3$) _____ 125° C.
   At bottom of column ($T_4$) ____ 95° C.
Temperature of the decanter ($T_5$) __ 60° C.
Fresh solvent/oil ratio _____ 200% by volume.

A raffinate was obtained with a viscosity index equal to 95 after de-waxing for a pour point of −15° C., and a pseudo-raffinate having a viscosity index equal to 65 after de-waxing for a pour point of −15° C.
The yields were as follows:

Raffinate=44.4% by weight
Pseudo-raffinate 7.4% by weight
Extract 48.2% by weight A comparison of these two experiments shows that two identical raffinates were obtained with very close yields. The two-stage process thus made it possible to effect an economy of 41% on the furfural employed. Moreover, a 7.4% yield of an oil (pseudo-raffinate) with a moderate viscosity index is also obtained.

The effect of deforming the temperature gradient in each column is illustrated in the following Example 2:

*Example 2*

The feedstock of Example 1 was solvent extracted with furfural to produce after dewaxing a raffinate having a viscosity index of 97 and a pour-point of −15° C. (*a*) with a linear temperature gradient in each column and (*b*) with the gradient in each column deformed so that the temperature in the upper third of each column was the same as that at the column top. Conditions and results are indicated in the following table:

| | First column, temp.,° C. | | Second column, temp.,° C. | | Raffinate yield, percent wt. | Furfural wash percent vol. |
|---|---|---|---|---|---|---|
| | Top | Base | Top | Base | | |
| Linear | 120 | 85 | 120 | 85 | 45 | 346 |
| Non-linear | 120 | 85 | 120 | 85 | 45 | 306 |

It is seen that with a non-linear gradient a 12% saving of furfural is realised with the same yield of raffinate.

The effect of increasing the base temperature of the second column is illustrated in the following Example 3:

*Example 3*

The feedstock of Example 1 was solvent extracted with furfural to produce a raffinate having a viscosity index of 95 and a pour-point of −15° C., the temperature gradient in each column being linear, the second column base temperature being varied.
Results are shown in the following table:

| First column, temp.,° C. | | Second column, temp.,° C. | | Settling-out vessel, temp.,° C. | Furfural wash, percent vol. | Raffinate yield, percent wt. |
|---|---|---|---|---|---|---|
| Top | Base | Top | Base | | | |
| 110 | 85 | 125 | 95 | 60 | 235 | 43 |
| 110 | 85 | 125 | 100 | 60 | 215 | 43.5 |
| 110 | 85 | 125 | 105 | 60 | 205 | 43.5 |
| 110 | 85 | 125 | 110 | 60 | 180 | 45 |

As the base temperature of the second column is raised, the required quantity of furfural decreases and there is a slight increase in raffinate yield.

The effect of decreasing the temperature in the settling out vessel is illustrated in the following Example 4.

*Example 4*

The feedstock of Example 1 was solvent extracted with furfural to produce a raffinate having a viscosity index of 95 and a pour-point of −15° C. under the following conditions.

| First column, temp.,° C. | | Second column, temp.,° C. | | Settling-out vessel, temp.,° C. | Furfural wash, percent vol. |
|---|---|---|---|---|---|
| Top | Base | Top | Base | | |
| 120 | 85 | 120 | 85 | 80 | 290 |
| 120 | 85 | 120 | 85 | 60 | 260 |
| 120 | 85 | 120 | 85 | 40 | 240 |
| 120 | 85 | 120 | 85 | 35 | 230 |

It is seen that the lower the settling out temperature, the lower is the required quantity of furfural.

I claim:
1. A process for solvent extracting a hydrocarbon feedstock comprising contacting the feedstock counter-currently with solvent in a first extraction column and recovering from the first column a primary raffinate and a primary extract, contacting the primary raffinate counter-currently with solvent in a second extraction column and recovering from the second column a sec- ondary raffinate and a secondary extract, passing the secondary extract to a settling-out vessel and recovering from the settling out vessel a pseudo-raffinate phase and a solvent phase, recycling the solvent phase to the first extraction column, treating the primary extract to separate solvent therefrom and recycling this solvent to the second extraction column, treating the pseudo-raffinate and the secondary raffinate to recover solvent therefrom, and combining this solvent with the solvent recovered from the primary extract.

2. A process as claimed in claim 1 wherein the hydrocarbon feedstock is a lubricating oil fraction.

3. A process as claimed in claim 1 wherein the solvent is furfural.

4. A process as claimed in claim 1 wherein the temperatures in the extraction columns lie within the range 175–50° C.

5. A process as claimed in claim 4 wherein the temperatures lie within the range 140–75° C.

6. A process as claimed in claim 1 wherein the temperature gradient in the first column is between 20–50° C. and in the second column between 10–30° C.

7. A process as claimed in claim 1 wherein the column top temperature is the same in each column and the first column has a steeper gradient than the second column.

8. A process as claimed in claim 1 wherein the temperature gradients in the columns are deformed so that the temperature gradient in the lower part of each column is steeper than that in the upper part of each column.

9. A process as claimed in claim 8 wherein the temperature in the upper third of each column is substantially the same as the column top temperature, decreasing substantially linearly down the remaining two-thirds of each column.

10. A process as claimed in claim 1 wherein the settling-out temperature is maintained at a temperature lower than that of the base of the second extraction column, within the range 20–80° C.

11. A process as claimed in claim 10 wherein the settling-out temperature is maintained within the range 40–60° C.

12. A two-stage continuous solvent extraction process for refining a hydrocarbon oil feedstock having a content of impurities, to obtain a refined hydrocarbon oil product having a negligible content of said impurities, comprising, in combination, the steps of:
 (a) continuously supplying a stream of the feedstock and a stream of solvent for said impurities, to a first solvent extraction zone, said solvent being a product recovered in a later stage of the process;
 (b) solvent extracting, in said zone, the feedstock supplied thereto and continuously recovering, as stream products, a primary extract phase and a primary raffinate phase,
  (i) said primary extract phase comprising a major portion of the impurities content of the feedstock supplied to said zone, and a major portion of the solvent supplied to said zone, and
  (ii) said primary raffinate phase comprising the remaining portion, of reduced impurities content, of the feedstock supplied to said zone, and the remaining portion of the solvent supplied to said zone;
 (c) supplying a stream of said primary raffinate phase and a stream of solvent for said impurities, to a second solvent extraction zone;
 ($c_1$) treating said primary extract phase to separate solvent therefrom and recycling this solvent to said second solvent extraction zone;
 (d) solvent extracting, in said second zone, the primary raffinate phase supplied thereto, and continuously recovering, as stream products, a secondary extract phase and a secondary raffinate phase,
  (i) said secondary extract phase comprising substantially the content of the impurities in the primary raffinate phase supplied to said second zone, and a major portion of the solvent supplied to said second zone, and
  (ii) said secondary raffinate phase comprising the remaining portion, of negligible impurities content, of the primary raffinate phase supplied to said second zone, and the remaining portion of the solvent supplied to said second zone;
 (e) supplying a stream of said secondary extract phase to a cooling zone;
 (f) cooling, in said cooling zone, the secondary extract phase supplied thereto, to a temperature at which the cooled secondary extract phase will stratify, and recovering, as stream products, a layer constituting a pseudo-raffinate phase and a layer constituting a solvent phase,
  (i) said pseudo-raffinate phase comprising substantially the content of hydrocarbons of said secondary extract phase, and a minor portion of the solvent content of said secondary extract phase, and
  (ii) said solvent phase comprising the major portion of the solvent content of said secondary extract phase, and a minor portion of the content of hydrocarbons of said secondary extract phase;
 ($f_1$) treating said pseudo-raffinate phase to recover solvent therefrom and combining this solvent with the solvent recovered from the primary extract phase;
 (g) supplying a stream of said solvent phase recovered from said secondary extract phase to said first solvent extraction zone as the solvent recovered as a product of a later stage of the process;
 (h) supplying a stream of said secondary raffinate phase to a separating zone;
 (i) freeing the secondary raffinate phase supplied to said separating zone of its solvent content, and recovering, as stream products, a solvent, and a solvent-free hydrocarbon oil constituting the desired refined hydrocarbon oil product; and, combining said solvent recovered from said secondary raffinate phase with the solvent separated from said primary extract phase.

13. A two-stage continuous solvent extraction process according to claim 12, including supplying a stream of fresh solvent to said second solvent extraction zone.

References Cited by the Examiner

UNITED STATES PATENTS

| | | | |
|---|---|---|---|
| 2,070,385 | 2/37 | Tuttle | 208—317 |
| 2,116,540 | 5/38 | Roberts | 208—317 |
| 2,346,639 | 4/44 | Andrews et al. | 208—317 |
| 2,754,249 | 7/56 | Myers et al. | 208—321 |
| 2,911,361 | 11/59 | Kleiss | 208—317 |
| 2,953,501 | 9/60 | Mignone | 208—317 |

DELBERT E. GANTZ, *Primary Examiner.*

ALPHONSO D. SULLIVAN, *Examiner.*